United States Patent [19]
Chappelow, Jr. et al.

[11] 3,742,062
[45] June 26, 1973

[54] FLUORINATED BETA-DIKETONES

[75] Inventors: Cecil C. Chappelow, Jr.; James F. Engel, both of Kansas City, Mo.

[73] Assignee: Kerr-McGee Corporation, Oklahoma City, Okla.

[22] Filed: Sept. 4, 1970

[21] Appl. No.: 69,939

[52] U.S. Cl. ............................................. 260/592
[51] Int. Cl. ........................................... C07c 49/80
[58] Field of Search .................................. 260/592

[56] References Cited
OTHER PUBLICATIONS
Reid et al., J. Am. Chem. Soc. 72, 2948–2952 (1950).

Primary Examiner—Daniel D. Horwitz
Attorney—William G. Addison

[57] ABSTRACT

A new class of compounds useful, for example, as metal extractants is provided. The compounds are $\beta$-diketones of the formula

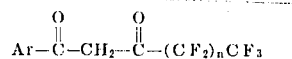

wherein $Ar$ is a perfluoro aromatic radical and $n$ has a value of 0 to 15. The compounds are produced via the Claisen condensation of an acetylaromatic compound and the lower alkyl ester of a perfluoroacid.

6 Claims, No Drawings

FLUORINATED BETA-DIKETONES

BACKGROUND OF THE INVENTION

Certain organic compounds are known to have the ability to chelate metal ions. Thus, it is known that the compound 2-thenoyltrifluoroacetone has extractive capability in metallurgical operations. However, there is a need for additional compounds having the capability of functioning as selective extractants for various metal ions.

SUMMARY OF THE INVENTION

In accordance with this invention, certain novel perfluorinated aromatic β-diketones have been discovered. These compounds are capable of chelating metal ions.

The novel compounds of the present invention are represented by the formula

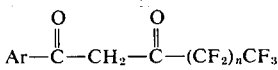

wherein Ar is a perfluoro aromatic radical having from six to 14 ring carbon atoms and
n has a value of 0 to 15.

By the term "perfluoro" is contemplated hydrocarbon moieties in which all free hydrogen atoms have been replaced by fluorine. Thus, the radical Ar may be pentafluorophenyl, heptafluorotolyl, heptafluoronapthyl, and nonafluorobiphenyl and where -(CF$_2$)$_n$CF$_3$ may be any of a variety of perfluoroaliphatic radicals, such as trifluoromethyl, pentafluoroethyl, heptafluoropropyl and pentadecafluoroheptyl radicals.

The aromatic radical may be substituted by perfluorinated lower alkyl groups. Examples of suitable lower alkyl groups include methyl, ethyl, n-propyl, iso-propyl, n-butyl, sec-butyl and tert-butyl.

Examples of the group Ar include the perfluoro derivatives of phenyl, tolyl, xylyl, n-propylphenyl, sec-butylphenyl, naphthyl, biphenyl and anthracyl radicals.

Examples of the radical -(CF$_2$)$_n$CF$_3$ include fluoro substituted straight and branched chain alkyl groups where n is 0 to 15. Examples of such groups include perfluoro derivatives of methyl, ethyl, n-propyl, iso-propyl, n-butyl, iso-butyl, tert-butyl, n-hexyl, n-octyl, iso-octyl, n-decyl and n-dodecyl radicals.

Representative compounds are 4,4,4-trifluoro-1- (p-heptafluorotolyl)-1,3-butanedione, 4,4,5,5,5-pentafluoro-1- (2-heptafluoronaphthyl)-1,3-pentanedione and 4,4,4-trifluoro-1-pentafluorophenyl- 1,3-butanedione.

The compounds of this invention may be prepared by reacting an acetyl substituted perfluoroaromatic compound of the formula

with an ester of the formula

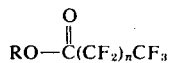

wherein Ar and n have the values as defined hereinbefore and R is a lower alkyl, preferably ethyl.

The reaction is via Claisen condensation of the above compounds conducted in the presence of a sodium alkoxide as the catalyst and an ether solvent. Preferred catalysts are sodium methoxide and sodium ethoxide. Exemplary ether solvents are diethyl ether and tetrahydrofuran. The reaction takes place in accordance with the following:

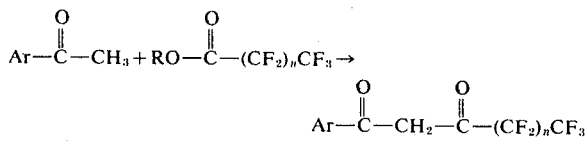

The foregoing description and the following specific examples are for purposes of illustration, and are not to be considered as limiting the scope of the invention, reference being had to the appended claims for this purpose.

EXAMPLE I 4,4,4-Trifluoro-1-pentafluorophenyl-1,3-butanedione

Dried sodium methoxide (0.1 mole) was suspended in anhydrous ether (100 ml.). Ethyl trifluoroacetate (14.2 g., 0.1 mole) in anhydrous ether (15 ml.) was added dropwise to the stirred suspension. During the exothermic reaction, nearly all of the sodium methosice reacted. Acetylpentafluorobenzene (21.0 g., 0.1 mole) in anhydrous ether (15 ml.) was added dropwise. This reaction was exothermic and the remainder of the sodium methoxide reacted. The resultant yellow, homogeneous reaction mixture was allowed to stand at room temperature overnight under a nitrogen blanket. Work-up was effected by addition of concentrated sulfuric acid (3 ml.) in water (30 ml.) followed by extraction with ether and washing with water. The ethereal extract was dried over anhydrous sodium sulfate and evaporated in vacuo. The crude product was distilled through a column packed with glass helices, 14.8 g., b.p. 77°–79°/4.7 torr (48.4 percent yield). A gas chromatogram (150°, 2 meter 20 percent SF–96 on Chromosorb P) of the pure liquid showed retention time of 5.6 min. An infrared spectrum (oil smear) of the compound showed strong absorption centered at 1620 cm$^{-1}$ (C=O) and a broad region centered at 1180 cm$^{-1}$ (C−F). The UV spectrum indicated λ maximum n hexane 289 mu (ε 10,820). The NMR spectrum (ref. Si(CH$_3$)$_4$) possessed a broad peak of chemical shift 13.7 ppm for the enolic hydrogen and a sharp singlet at 6.2 ppm for the olefinic hydrogen. A $^{19}$F NMR spectrum (ref., Freon 11) displayed a peak of chemical shift 76.8 ppm for the methyl fluorines and peaks at 137.6 ppm, 146.7 ppm, and 159.3 ppm for the ortho, para, and meta aromatic fluorines, respectively.

Anal. Calcd. for C$_{10}$H$_2$F$_8$O$_2$: C, 39.23; H, 0.66; F, 49.65. Found: C, 39.31; H, 0.69; F, 49.60.

EXAMPLE II 4,4,5,5,5-Pentafluoro-1-pentafluorophenyl-1,3-pentanedione

Dried sodium methoxide (0.1 mole) was suspended in anhydrous ether (100 ml.) and ethyl perfluoropropionate (19.2 g., 0.1 mole) in anhydrous ether (15 ml.) was added dropwise to the stirred slurry. The reaction was exothermic and nearly all of the sodium methoxide was consumed. Dropwise addition of acetylperfluorobenzene (21.0 g., 0.1 mole) in anyhydrous ether (15 ml.) caused an exothermic reaction. The rest of the sodium methoxide reacted and the reaction mixture turned yellow. After allowing the homogeneous reaction mixture to stand at room temperature overnight under a nitrogen blanket, 3 ml. of concentrated sulfuric acid and 30 ml. of water was added. The mixture was extracted with ether and the extracts washed with water. The ether solution was dried over anhydrous sodium sulfate and evaporated in vacuo. The crude product was distilled through a Vigreaux column to give 12.4 g., b.p. 83°–98°/2.9 torr, which contained some higher boiling impurities, as shown by gas chromatography (150°C, 2 meters 20 percent SF–96 on Chromosorb P). This material was chromatographed on silica gel in benzene. The course of elution was followed by gas chromatography. In this way 9.7 g. (27.2 percent yield) of pure compound was isolated; however, it was red-orange in color. The color was easily removed by a flash distillation. An infrared spectrum (oil smear) of the pure compound showed strong absorption centered at 1620 cm $^{-1}$(C=O) and a broad region centered at 1200 cm $^{-1}$(C–F). The UV spectrum indicated λ maximum $n$-hexane 292 mu (ε 12,120) The NMR spectrum (ref., Si(CH$_3$)$_4$) displayed a very sharp singlet of chemical shift 13.9 ppm for the enolic hydrogen and a sharp singlet at 6.3 ppm for the olefinic hydrogen. A $^{19}$F NMR spectrum (ref., Freon 11) displayed a peak of chemical shift 82.9 ppm for the methyl fluorines, a peak at 124.6 ppm for the methylene fluorines, and peaks at 139.3 ppm, 148.0 ppm, and 161.0 ppm for the ortho, para, and meta aromatic fluroines, respectively.

Anal. Calcd. for $C_{11}H_2F_{10}O_2$: C, 37.10; H, 0.57; F, 53.35. Found: C, 37.28; H, 0.72; F, 53.40.

EXAMPLE III 4,4,5,5,6,6,6-Heptafluoro-1-pentafluorophenyl-1,3-hexanedione

Dried sodium methoxide (0.1 mole) was suspended in anhydrous ether (100 ml.) and ethyl perfluorobutyrate (24.2 g., 0.1 mole) in anhydrous ether (15 ml.) was added dropwise to the stirred suspension. The reaction was exothermic and nearly all of the sodium methoxide reacted. The reaction mixture was cooled in an ice bath before the acetylperfluorobenzene (21.0 g., 0.1 mole) was added dropwise in anhydrous ether (100 ml.) over 1 hr. After complete addition, the reaction mixture was allowed to warm to room temperature. There was not noticeable evolution of heat, but the reaction mixture slowly turned yellow as it warmed up. The reaction mixture was allowed to stand at room temperature overnight under a nitrogen blanket. Workup was effected by addition of concentrated sulfuric acid (3 ml.) in water (30 ml.) followed by extraction with ether and washing with water. The ether extract was dried over anhydrous sodium sulfate and evaporated in vacuo. The crude product was distilled through a column packed with glass helices, 25.0 g., b.p. 88°–89°/3.4 torr (62 percent yield). A gas chromatogram (150°, 2 meter 20 percent SF–96 on Chromosorb P) of the pure liquid showed a retention time of 4.9 min. An infrared spectrum (oil smear) of the compound showed strong absorption band at 1625 cm $^{-1}$(C=O) and a broad region centered at 1220 cm $^{-1}$(C–F). The UV spectrum indicated λ maximum $n$-hexane 292 mu (ε 12,550). The NMR spectrum (ref., Si(CH$_3$)$_4$) displayed a sharp peak of chemical shift 13.9 ppm for the enolic hydrogen and a sharp singlet at 6.2 ppm for the olefinic hydrogen. A $^{19}$F NMR spectrum (ref., Freon 11) displayed a peak of chemical shift at 80.7 ppm for the methyl fluorines, peaks at 121.5 ppm and 126.7 ppm for the methylene fluorines, and peaks at 138.0 ppm, 147.6 ppm, and 160.1 ppm for the ortho, para, and meta aromatic fluorines, respectively.

Anal. Calcd. for $C_{12}H_2F_2O_2$: C, 35.49; H, 0.50; F, 56.14. Found: C, 35.36; H, 0.97; F, 56.09.

EXAMPLE IV 4,4,5,5,6,6,7,7,8,8,9,9,10,10,10-Pentadecafluoro-1-pentafluoro-phenyl-1,3- decanedione Sodium methoxide was prepared in situ by adding sodium metal (2.4 g., 0.1 mole) to anhydrous methanol (50 ml.). After complete reaction the excess methanol was distilled and the salt was thoroughly dried by a stream of nitrogen. The sodium methoxide was suspended in anhydrous ether (100 ml.) and ethyl perfluorocaprylate (44.1 g., 0.1 mole) in anhydrous ether (25 ml.) was added dropwise to the stirred suspension. The reaction was exothermic and nearly all of the sodium methoxide reacted. The reaction mixture was cooled in an ice bath before the acetylperfluorobenzene (21.0 g., 0.1 mole) was added dropwise in anhydrous ether (100 ml.) over 1 hr. After complete addition the reaction mixture was allowed to warm to room temperature. Although there was no noticeable evolution of heat, the reaction mixture slowly turned yellow as it warmed up. After allowing the reaction mixture to stand at room temperature overnight under a nitrogen blanket, a solution of 3 ml. of concentrated sulfuric acid in 30 ml. water was added. Following extraction with ether, washing with water, and drying over anhydrous sulfate, the ether extract was evaporated in vacuo. The crude product was distilled through a column packed with glass helices, 22.2 g., b.p. 107°–110°/1.2 torr (37 percent yield). A gas chromatogram (200°, 2 meter 20 percent SF–96 on Chromosorb P) indicated one major peak with a retention time of 5.5 min. for the product, and one minor peak of higher boiling impurity. An NMR spectrum (ref., Si(CH$_3$)$_4$) showed a very sharp peak of chemical shift at 13.9 ppm for the enolic hydrogen and a peak at 6.2 ppm for the olefinic hydrogen. The integrals of the two major peaks were in good agreement with theory (1:1). A $^{19}$F NMR spectrum (ref., Freon 11) displayed a peak of chemical shift at 80.7 ppm for the methyl fluorines, a region from 119.8 ppm to 125.4 ppm for the methylene fluorines, and peaks at 137.1 ppm, 146.3 ppm, and 159.3 ppm for the ortho, para, and meta aromatic fluorines, respectively. An infrared spectrum showed strong absorption centered at 1620 cm $^{-1}$(C=O) and a broad region centered at 1220 cm $^{-1}$(C–F). The UV spectrum indicated λ maximum $n$-hexane 293 mu (ε 11,650).

Anal. Calcd. for $C_{16}H_2F_{20}O_2$: C, 31.70; H, 0.33; F, 62.69. Found: C, 31,76; H, 0.59; F, 62.65.

The copper complex was prepared by shaking aqueous copper acetate with an ether solution of the β-diketone. The ether layer was washed with water to remove excess copper acetate, dried over sodium sulfate and evaporated to dryness. The chelate could be destroyed in ether solution by washing it several times with 15 percent sulfuric acid. The chelate was found to be soluble in ether and chloroform, but only slightly soluble in benzene, toluene, cyclohexane, dioxane and carbon tetrachloride at room temperature. The chelate was recrystallized from benzene to give m.p. 87°–90°. A second crystallization from benzene gave m.p. 88°–94°; however, the sample had to be meticulously dried in vacuo since the solid was highly solvated. Further evidence of solvation was seen when a sample of the chelate was recrystallized from dioxane to give a product of much lighter green color and m.p. 134°–139°.

A sample of the copper chelate twice recrystallized from benzene was submitted for analysis.

Anal. Calcd. for $(C_{16}HF_{20}O_2)Cu$: C, 30.17; H, 0.16; F, 59.66; Cu, 4.99. Found: C, 31.13; H, 0.29; F, 59.88; Cu, 4.85.

What is claimed is:

1. A compound of the formula:

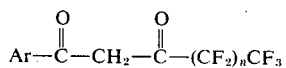

wherein $Ar$ is a perfluoro aromatic radical which may be substituted by perfluorinated lower alkyl groups and contains from six to 14 ring carbon atoms; and $n$ has a value of from 0 to 15.

2. A compound as set forth in claim 1 wherein $Ar$ contains six ring carbon atoms.

3. The compound set forth in claim 2 wherein $n$ is zero.

4. The compound set forth in claim 2 wherein $n$ is 1.

5. The compound set forth in claim 2 wherein $n$ is 2.

6. The compound set forth in claim 2 wherein $n$ is 6.

* * * * *